US012777285B2

(12) United States Patent
Paek et al.

(10) Patent No.: US 12,777,285 B2
(45) Date of Patent: Oct. 27, 2026

(54) AUDIO DEVICE WITH AUDIO OUTPUT IN AN UPWARD DIRECTION

(71) Applicant: LG ELECTRONICS INC., Seoul (KR)

(72) Inventors: Seunghark Paek, Seoul (KR); Daegee Kang, Seoul (KR); Myoungcheol Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 134 days.

(21) Appl. No.: 18/726,085

(22) PCT Filed: Jan. 3, 2022

(86) PCT No.: PCT/KR2022/000006
§ 371 (c)(1),
(2) Date: Jul. 1, 2024

(87) PCT Pub. No.: WO2023/128036
PCT Pub. Date: Jul. 6, 2023

(65) Prior Publication Data
US 2025/0106559 A1 Mar. 27, 2025

(51) Int. Cl.
*H04R 5/04* (2006.01)
*H04R 3/12* (2006.01)
*H04R 5/02* (2006.01)

(52) U.S. Cl.
CPC ................. *H04R 5/04* (2013.01); *H04R 3/12* (2013.01); *H04R 5/02* (2013.01); *H04R 2420/01* (2013.01)

(58) Field of Classification Search
CPC ... H04R 5/02; H04R 3/12; H04R 5/04; H04R 2205/024; H04R 2499/15; H04R 1/26;
(Continued)

(56) References Cited

U.S. PATENT DOCUMENTS

2005/0177360 A1* 8/2005 Schuijers .................. H04S 3/00 704/201
2008/0240474 A1* 10/2008 Sakamoto ................ H04R 5/02 381/300
(Continued)

FOREIGN PATENT DOCUMENTS

JP 4774100 9/2011
KR 19980036958 * 8/1998
(Continued)

OTHER PUBLICATIONS

Korean Intellectual Property Office Application No. 10-2024-7021993, Office Action dated Sep. 18, 2025, 7 pages.
(Continued)

*Primary Examiner* — Norman Yu
(74) *Attorney, Agent, or Firm* — LEE, HONG, DEGERMAN, KANG & WAIMEY

(57) ABSTRACT

The present disclosure relates to an audio device and an operating method thereof. The audio device according to an embodiment of the present disclosure includes: a first speaker disposed on a left side; a second speaker disposed on a right side; a third speaker disposed between the first speaker and the second speaker; and a controller, wherein: the first to third speakers are arranged to output audio in an upward direction; and the controller generates a third channel signal corresponding to the third speaker based on a first channel signal corresponding to the first speaker and a second channel signal corresponding to the second speaker, and outputs audio corresponding to the third channel signal through the third speaker. Various other embodiments are also possible.

10 Claims, 15 Drawing Sheets

(58) Field of Classification Search
CPC ... H04R 2420/01; H04S 7/30; H04S 2400/01; H04S 3/00; H04S 5/005
USPC ............................................. 381/300, 27, 80
See application file for complete search history.

(56) References Cited

U.S. PATENT DOCUMENTS

| | | | | |
|---|---|---|---|---|
| 2011/0160883 A1* | 6/2011 | Yasuda | .................... | H04R 3/14<br>700/94 |
| 2014/0355797 A1 | 12/2014 | North et al. | | |
| 2017/0201829 A1 | 7/2017 | Kim et al. | | |

FOREIGN PATENT DOCUMENTS

| | | | |
|---|---|---|---|
| KR | 10-2008-0080875 | 9/2008 | |
| KR | 10-2011-0072923 | 6/2011 | |
| KR | 10-2012-0101186 | 9/2012 | |
| KR | 10-2017-0083351 | 7/2017 | |
| KR | 10-2021-0088342 | 7/2021 | |
| WO | WO-2021145152 A1 * | 7/2021 | ............... H04R 1/28 |

OTHER PUBLICATIONS

PCT International Application No. PCT/KR2022/000006, International Search Report dated Sep. 29, 2022, 4 pages.

* cited by examiner

AUDIO DEVICE WITH AUDIO OUTPUT IN AN UPWARD DIRECTION

CROSS-REFERENCE TO RELATED APPLICATION(S)

This application is the National Stage filing under 35 U.S.C. 371 of International Application No. PCT/KR2022/000006, filed on Jan. 3, 2022, the contents of which is hereby incorporated by reference herein in its entirety.

TECHNICAL FIELD

The following description relates to an audio device.

BACKGROUND ART

A multimedia system includes an image display device for displaying an image that can be viewed by a user, an audio device for outputting audio corresponding to the image, and the like.

Recently, with the worldwide transition from analog to digital broadcasting, there has been a growing user demand for an audio device capable of providing rich stereophonic sound along with a high-definition screen of digital broadcasting.

Particularly, an audio system is widely used, which improves sound quality by outputting various audios in various directions through a plurality of speakers. For example, the audio system may include a woofer outputting a low-frequency audio, a midrange outputting a mid-frequency audio, and a tweeter outputting a high-frequency audio.

Meanwhile, speakers may be disposed at each of the upper left and right sides of the audio device so that audio may be output upward. In this case, if audio is output through the speakers disposed at the upper left and right sides of the audio device, the quality of sound heard by a user may vary depending on the user's location. For example, if audio is output through the speakers disposed at the upper left and right sides of the audio device, the energy of sound provided to a user may decrease depending on a listening position of a user, the size of a listening place, sound absorption degree according to the material of a floor or wall, interference between waveforms of the audio, and the like.

DISCLOSURE OF INVENTION

Technical Problem

It is an objective of the present disclosure to solve the above and other problems.

It is another objective of the present disclosure to provide an audio device capable of improving the quality of sound, transmitted to a user, by using a plurality of upper speakers provided to output audio in an upward direction.

It is yet another objective of the present disclosure to provide an audio device capable of improving the quality of sound transmitted to a user located at the front.

Solution to Problem

In order to achieve the above objectives, an audio device according to an embodiment of the present disclosure includes: a first speaker disposed on a left side; a second speaker disposed on a right side; a third speaker disposed between the first speaker and the second speaker; and a controller, wherein: the first to third speakers are arranged to output audio in an upward direction; and the controller generates a third channel signal corresponding to the third speaker based on a first channel signal corresponding to the first speaker and a second channel signal corresponding to the second speaker, and outputs audio corresponding to the third channel signal through the third speaker.

In order to achieve the above objectives, a method of operating an audio device according to an embodiment of the present disclosure includes: generating a third channel signal corresponding to a third speaker based on a first channel signal corresponding to a first speaker and a second channel signal corresponding to a second speaker, the first speaker disposed on a left side, the second speaker disposed on a right side, and the third speaker disposed between the first speaker and the second speaker; and outputting audio corresponding to the third channel signal through the third speaker, wherein the first to third speakers are arranged to output audio in an upward direction.

Advantageous Effects of Disclosure

An audio device and an operating method thereof according to the present disclosure have the following effects.

According to at least one embodiment of the present disclosure, the quality of sound transmitted to a user may be improved by using a plurality of upper speakers disposed on the left and right sides and at the center of an audio device to output audio in an upward direction.

In addition, according to at least one embodiment of the present disclosure, the quality of sound transmitted to a user located at the front may be improved.

Further scope of applicability of the present disclosure will become apparent from the detailed description given hereinafter. However, it should be understood that the detailed description and specific examples, while indicating preferred embodiments of the present disclosure, are given by illustration only, since various changes and modifications within the spirit and scope of the present disclosure will become apparent to those skilled in the art from this detailed description.

MODE OF DISCLOSURE

Figure 1:
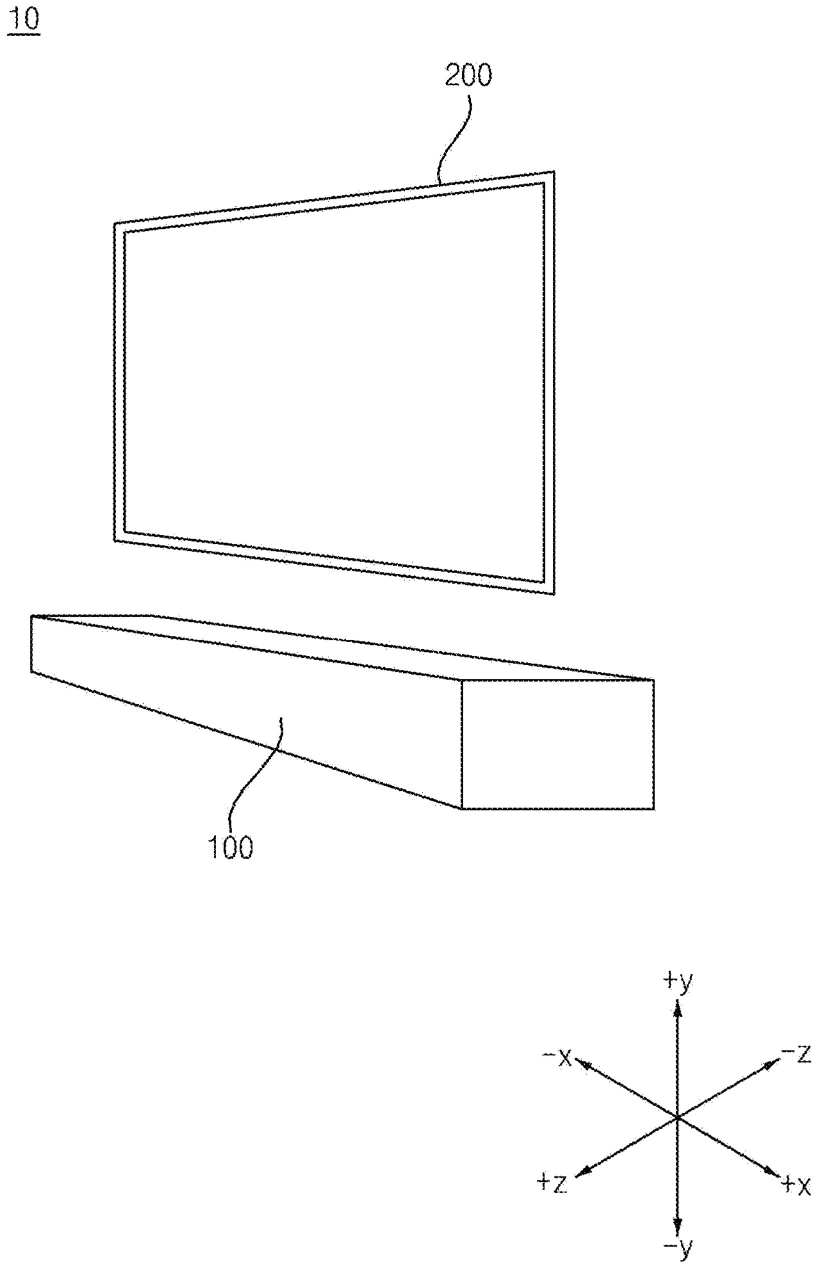
FIG. 1 is a diagram illustrating a multimedia system according to an embodiment of the present disclosure.

Hereinafter, the present disclosure will be described in detail with reference to the accompanying drawings. In order to clearly and briefly describe the present disclosure, components that are irrelevant to the description will be omitted in the drawings, and the same reference numerals are used throughout the drawings to designate the same or similar components.

The suffixes, such as "module" and "unit," for elements used in the following description are given simply in view of the ease of the description, and do not have a distinguishing meaning or role. Therefore, the "module" and "unit" may be used interchangeably.

It should be understood that the terms "comprise," "include," "have," etc. when used in this specification, specify the presence of stated features, integers, steps, operations, elements, components, or combinations thereof but do not preclude the presence or addition of one or more other features, integers, steps, operations, elements, components, or combinations thereof.

It will be understood that, although the terms first, second, etc., may be used herein to describe various elements, these elements should not be limited by these terms. These terms are only used to distinguish one element from another.

Figure 2:
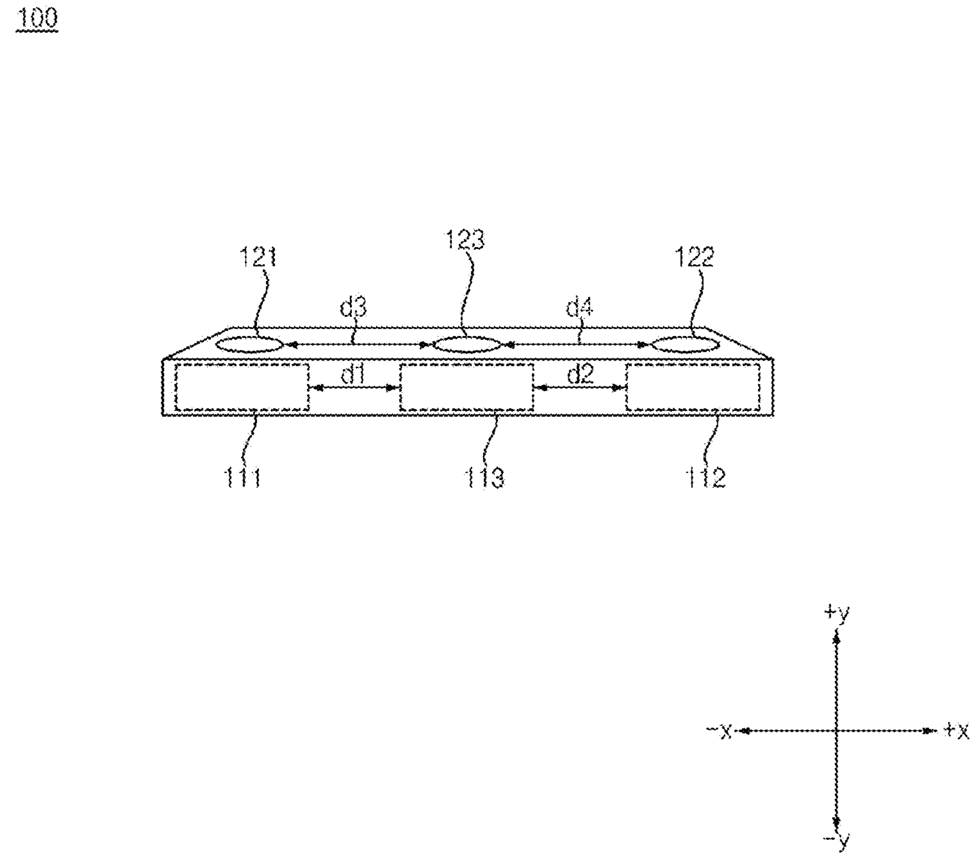
FIG. 2 is a diagram illustrating an audio device of FIG. 1.

FIG. 1 is a diagram illustrating a multimedia system according to an embodiment of the present disclosure, and FIG. 2 is a diagram illustrating an audio device of FIG. 1.

Referring to FIGS. 1 and 2, a multimedia system 10 may include an audio device 100 and/or an image display device 200.

The audio device 100 may include at least one speaker 111 to 113, 121 to 123. The at least one speaker 111 to 113, 121 to 123 may include a vibration plate (not shown) that generates vibration in response to a signal.

It is illustrated in the drawing that the audio device 100 is a soundbar having a bar shape that is elongated in a longitudinal direction, but the present disclosure is not limited thereto.

A direction parallel to a length direction of the audio device 100 may be referred to as a positive x-axis direction, a negative x-direction, a left direction, or a right direction.

A direction in which front speakers 111 to 113 output audio may be referred to as a positive z-axis direction, a forward direction, or a front side. A direction opposite to the direction in which the front speakers 111 to 113 output audio may be referred to as a negative z-axis direction, a rearward direction, or a rear side.

A height direction of the audio device 100, i.e., a direction parallel to a direction in which upper speakers 121 to 123 output audio may be referred to as a positive y-axis direction, an upward direction, or an upper side. A direction opposite to the direction in which the upper speakers 121 to 123 output audio may be referred to as a negative y-axis direction, a downward direction, or a lower side.

The audio device 100 may output audio in at least one direction through the at least one speaker 111 to 113, 121 to 123. For example, the audio device 100 may output audio in the forward direction through at least one of the plurality of front speakers 111 to 113. For example, the audio device 100 may output audio in the upward direction through at least one of the plurality of upper speakers 121 to 123.

A separation distance d1 between a front left speaker 111 and a front center speaker 113 may be equal to a separation distance d2 between a front right speaker 112 and the front center speaker 113.

A separation distance d3 between an upper left speaker 121 and an upper center speaker 123 may be equal to a separation distance d4 between an upper right speaker 122 and the upper center speaker 123.

Meanwhile, the multimedia system 10 may further include at least one sub audio device (not shown).

Each sub audio device may include at least one speaker. For example, the sub audio device may include a speaker which is the same as/similar to the at least one speaker 111 to 113, 121 to 123 included in the audio device 100.

The sub audio device may include a passive radiator. The passive radiator may refer to a unit used in conjunction with a woofer in order to enhance audio output in a low frequency range.

The sub audio device may be communicatively connected by wire or wirelessly to the audio device 100. For example, the sub audio device may be wirelessly connected to the audio device 100 through Bluetooth.

The sub audio device may output audio based on an audio signal received from the audio device 100.

The image display device 200 may be a device for processing and outputting an image. The image display device 200 may be television (TV), notebook computer, smartphone, tablet computer, etc., but is not particularly limited as long as it can output a screen on which an image is displayed.

The image display device 200 may receive and process a broadcast signal and may output a signal-processed broadcast image. When the image display device 200 receives the broadcast signal, the image display device 200 may correspond to a broadcast receiver. In this case, the image display device 200 may receive a broadcast signal wirelessly through an antenna or may receive a broadcast signal by wire through a cable. For example, the image display device 200 may receive a terrestrial broadcast signal, a satellite broadcast signal, a cable broadcast signal, an Internet Protocol Television (IPTV) broadcast signal, and the like.

The image display device 200 may transmit/receive a signal including data to and from the audio device 100 through wired/wireless communication. For example, the image display device 200 may transmit an audio signal, corresponding to an image output through a screen, to the audio device 100.

Figure 3:
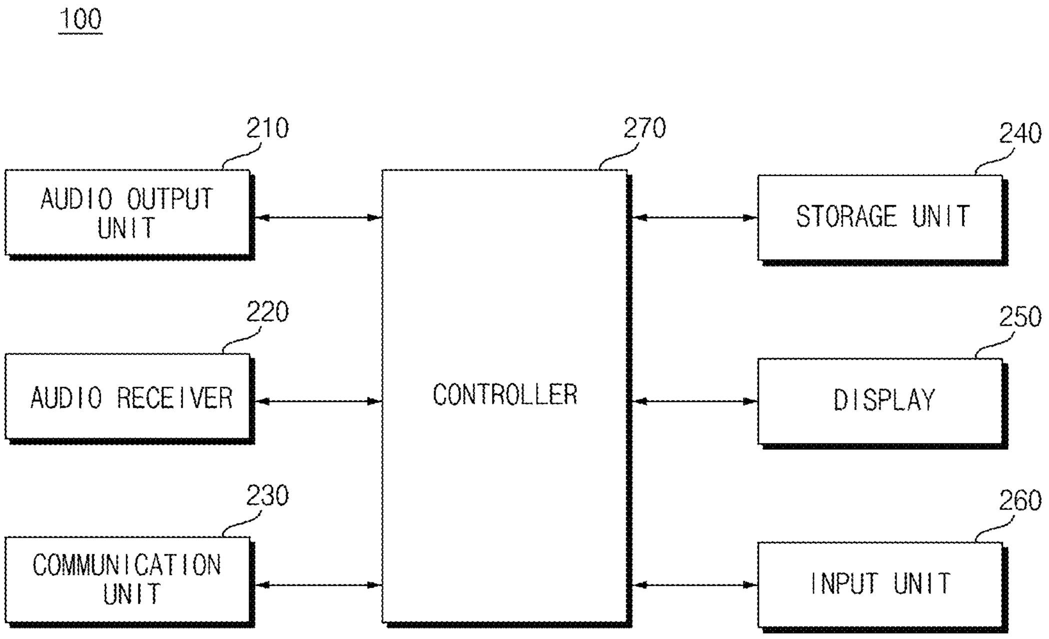
FIG. 3 is an internal block diagram of the audio device of FIG. 2.

FIG. 3 is an internal block diagram of the audio device of FIG. 2.

The audio device 100 may include an audio output unit 210, an audio receiver 220, a communication unit 230, a storage unit 240, a display 250, an input unit 260, and/or a controller 270.

The audio output unit 210 may include at least one speaker 111 to 113, 121 to 123. For example, the audio output unit 210 may receive an audio signal processed by the controller 270, to output audio.

The audio receiver 220 may include at least one microphone. For example, the audio receiver 220 may include a plurality of microphones spaced apart from each other by a predetermined separation distance.

The communication unit 230 may transmit/receive a signal including data to/from an external device. The communication unit 230 may include at least one communication module.

The communication unit 230 may transmit/receive a signal by using a wireless communication method such as Wi-Fi, Bluetooth, Zigbee, etc., as well as a wired communication method such as High-Definition Multimedia Interface (HDMI), optical cable communication, and the like. For example, the communication unit 230 may receive an audio signal from the image display device 200. For example, the communication unit 230 may transmit the audio signal, processed by the controller 270, to the sub audio device. For example, the communication unit 230 may receive a user input signal, such as power on/off, volume setting, etc., from a remote control device (not shown) such as a remote control, and the like.

The storage unit 240 may store a program for processing and controlling each signal in the controller 270. The storage unit 240 may store a signal-processed voice or data signal.

For example, the storage unit 240 may store application programs designed for the purpose of performing various tasks that may be processed by the controller 270. For example, the storage unit 240 may selectively provide some of the stored application programs upon request of the controller 270.

The programs and the like stored in the storage unit 240 are not particularly limited as long as the programs may be executed by the controller 250.

The storage unit 240 may also perform a function of temporarily storing an audio or data signal received from an external device through the communication unit 230.

While FIG. 3 illustrates an example in which the storage unit 240 is provided separately from the controller 270, the scope of the present disclosure is not limited thereto, and the storage unit 240 may also be included in the controller 270.

The display 250 may output a message indicating an operating state of the audio device 100. For example, the display 250 may output a message indicating a volume state, a power state, and the like of the audio device 100. Meanwhile, the audio device 110 may further include a display device such as a light emitting diode (LED).

The input unit 260 may include an input device (e.g. a key, a touch panel, etc.) capable of receiving a user input. The input unit 260 may transmit an instruction corresponding to the received user input to the controller 270.

The controller 270 may be connected to each component included in the audio device 100, to control the overall operation of each component.

The controller 270 may include at least one processor. Here, the processor may be a general processor such as a central processing unit (CPU). Obviously, the processor may be a dedicated device such as an ASIC or other hardware-based processor.

The controller 270 may receive the entire audio signal from the image display device 200 through the communication device 230.

The controller 270 may check attribute information of an audio signal. The attribute information may include volume level, audio channel (e.g., mono, 2 channels, 4 channels, and 5.1 channels), audio signal quality (e.g., number of bits (16 bits and 24 bits)), and audio type (e.g., voice and music).

The controller 270 may process an audio signal. The controller 270 may include various decoders for processing the audio signal.

The controller 270 may process the entire audio signal based on the attribute information of the audio signal. For example, the controller 270 may process a base, a treble, a volume control, and the like with respect to the entire audio signal.

The controller 270 may process the entire audio signal for each channel based on the attribute information of the audio signal. For example, if the entire audio signal is a two-channel signal, i.e., a stereo signal, the controller 270 may extract signals, respectively corresponding to a left channel and a right channel, from the entire audio signal. For example, if the entire audio signal is a four-channel signal, the controller 270 may extract signals, respectively corresponding to front left and right channels and upper left and right channels, from the entire audio signal. For example, if the entire audio signal is a 5.1-channel signal, the controller 270 may extract signals, respectively corresponding to front left and right channels, a front center channel, and upper left and right channels, from the entire audio signal.

The controller 270 may output a signal to the audio output unit 210 so that audio may be output through the at least one speaker 111 to 113, 121 to 123. For example, the upper left speaker 121 may output audio based on a channel signal corresponding to the upper left channel, which is transmitted from the controller 270.

Meanwhile, the controller 270 may separately include a component for processing the entire audio signal and a component for processing the channel signal extracted from the entire audio signal. In some embodiments, the respective components included in the controller may be located in the same or similar region or in separate regions.

FIGS. 4 to 14 are diagrams referred to in the description of an audio device according to various embodiments of the present disclosure.

Figure 4:
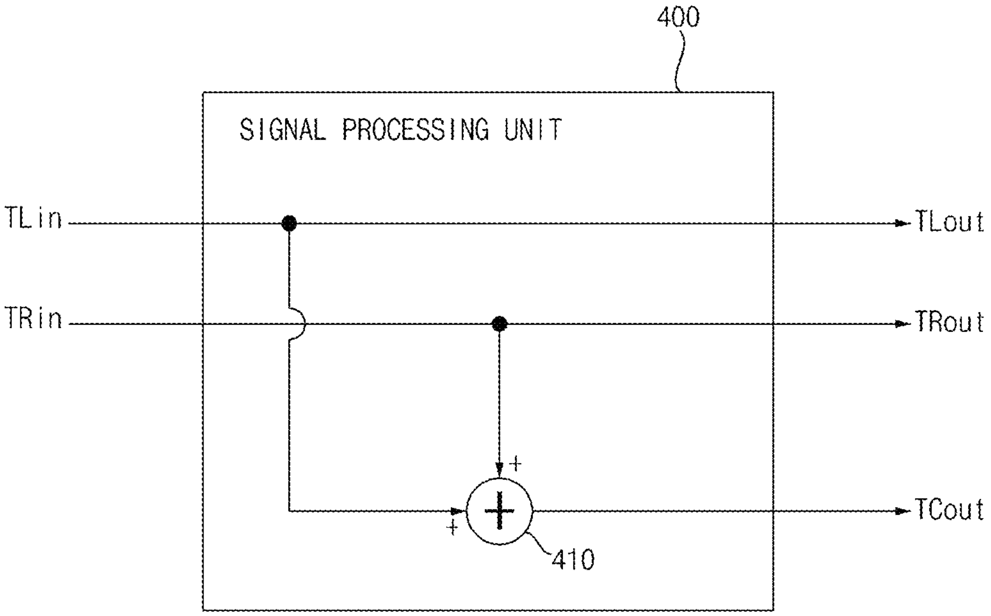
FIGS. 4 to 14 are diagrams referred to in the description of an audio device according to various embodiments of the present disclosure.

Referring to FIG. 4, the audio device 100 may include a signal processing unit 400 for processing a channel signal.

In this disclosure, it is illustrated that the signal processing unit 400 is included in the controller 270, but the present disclosure is not limited thereto. For example, the signal processing unit 400 may be included as a separate component from the controller 270 in the audio device 100.

The signal processing unit 170 may receive a plurality of channel signals extracted from the entire audio signal. The signal processing unit 400 may receive a signal of an upper left channel (hereinafter referred to as a first channel signal TLin) and a signal of an upper right channel (hereinafter referred to as a second channel signal TRin). In this case, the first channel signal TLin and the second channel signal TRin may be time domain signals.

The signal processing unit 400 may output at least one channel signal based on the first channel signal TLin and the second channel signal TRin. The signal processing unit 400 may be referred to as an upmixer.

The signal processing unit 400 may output channel signals corresponding to the received first channel signal TLin and second channel signal TRin, respectively. Here, a channel signal corresponding to the first channel signal TLin may be referred to as a first output signal TLout, and a channel signal corresponding to the second channel signal TRin may be referred to as a second output signal Trout. For example, the signal processing unit 400 may output the first channel signal TLin and the second channel signal TRin, as they are, as the first output signal TLout and the second output signal Trout, respectively. For example, the signal processing unit 400 may generate and output the first output signal TLout and the second output signal Trout which correspond to the first channel signal TLin and the second channel signal TRin, respectively.

The signal processing unit 400 may output a signal of an upper center channel (hereinafter referred to as a third channel signal TCout) based on the first channel signal TLin and the second channel signal TRin. For example, the signal processing unit 400 may generate a signal, obtained by adding up the first channel signal TLin and the second channel signal TRin, as the third channel signal TCout. To this end, the signal processing unit 400 may include an adder 410.

Figure 5:
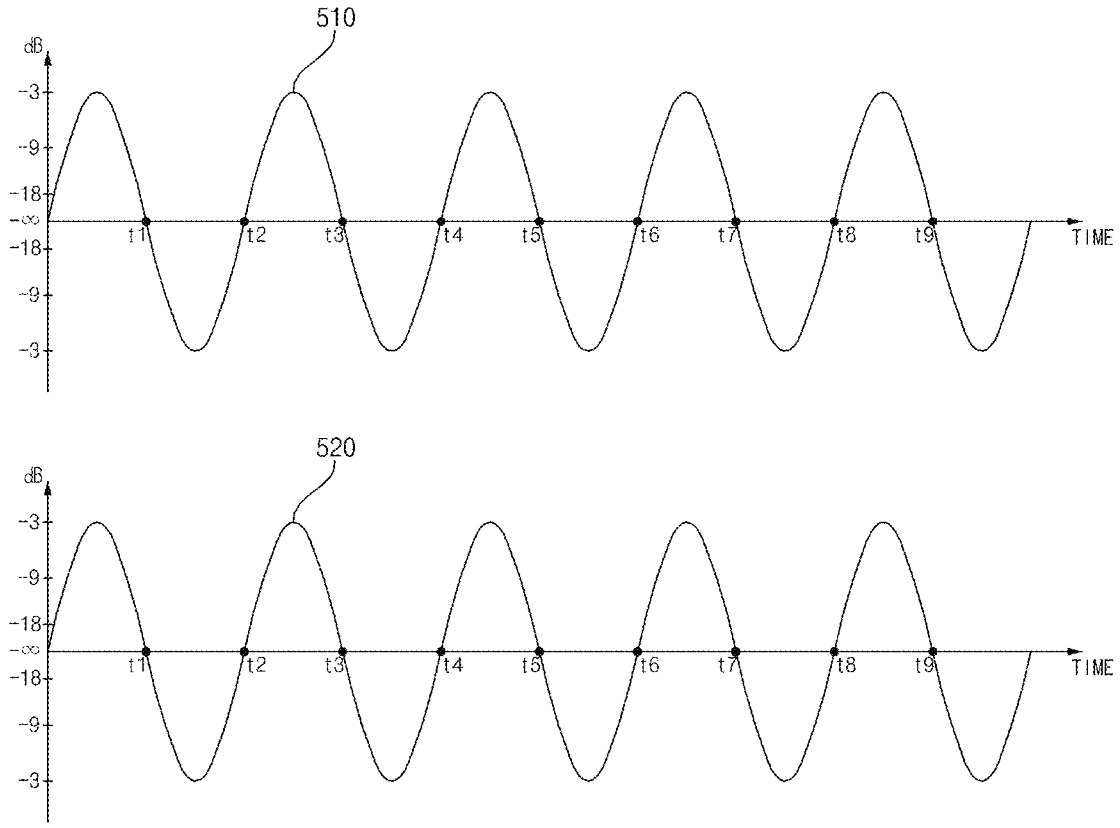
Figure 6:
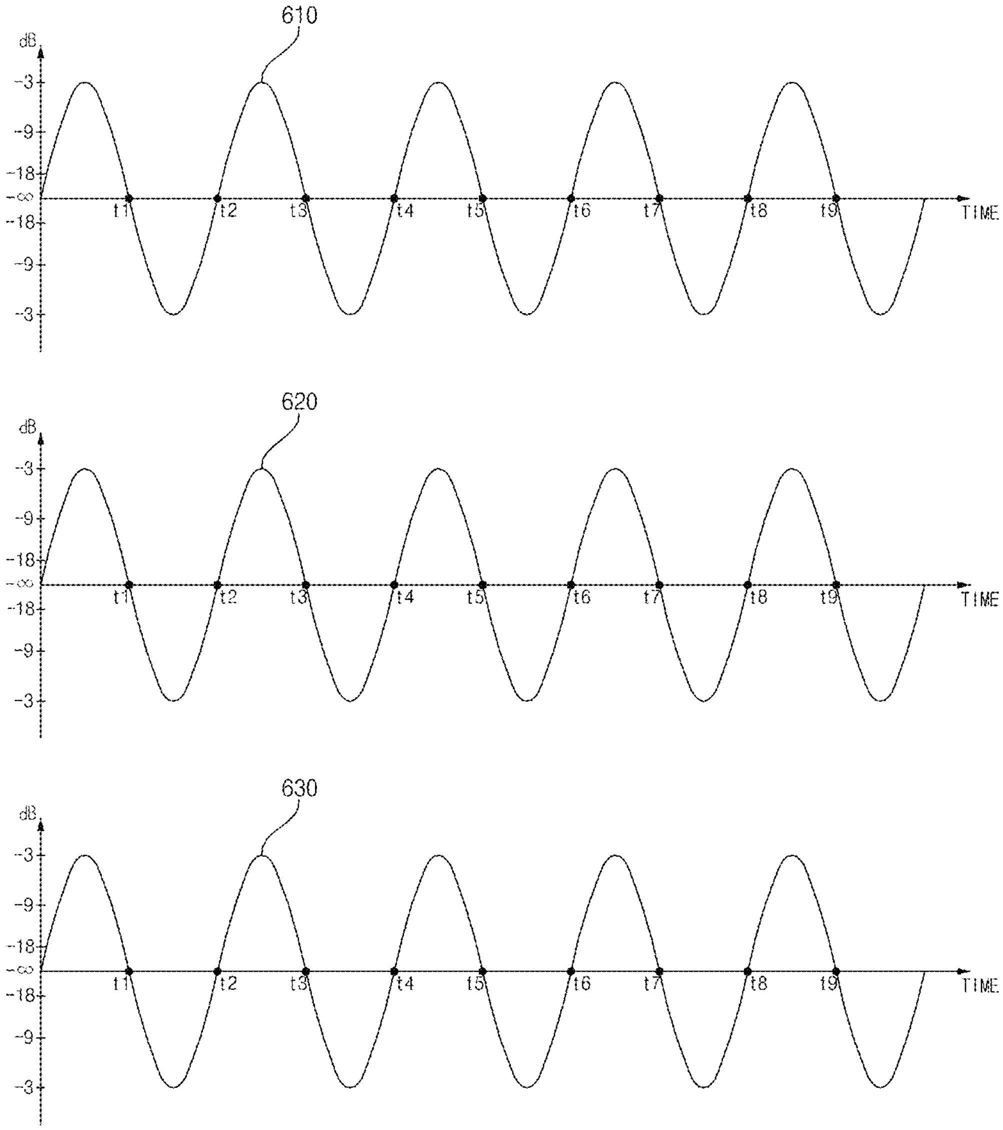

Referring to FIGS. 5 and 6, a waveform 510 of the first channel signal TLin may be the same as a waveform 520 of the second channel signal TRin in the time domain. In this case, a waveform 610 of the first output signal TLout output from the signal processing unit 400 may be the same as a waveform 620 of the second output signal Trout.

The audio device 100 may output the same audio through the upper left speaker 121 and the upper right speaker 122 based on the first output signal TLout and the second output signal Trout.

If the waveform 510 of the first channel signal TLin is the same as the waveform 520 of the second channel signal TRin in the time domain, a waveform 630 of the third channel signal TCout may correspond to the waveform 610 of the first output signal TLout and the waveform 620 of the second output signal Trout.

In one embodiment, the signal processing unit 400 may adjust an amplitude of a signal obtained by adding up the first channel signal TLin and the second channel signal TRin. For example, the waveform 630 of the third channel signal TCout may be adjusted so that an amplitude thereof may be smaller than the amplitude of the signal obtained by adding up the first channel signal TLin and the second channel signal TRin.

In one embodiment, the signal processing unit 400 may adjust the amplitude of the first channel signal TLin and the second channel signal TRin. For example, the signal processing unit 400 may adjust the amplitude of the first channel signal TLin and the second channel signal TRin so that the amplitude thereof may be reduced. In this case, the signal processing unit 400 may generate the third channel signal TCout by adding up the first channel signal TLin and the second channel signal TRin which are amplitude-adjusted.

The audio device 100 may output audio through the upper center speaker 123 based on the third channel signal TCout. In this case, the audio output through the upper center speaker 123 may be the same as audio output through the upper left speaker 121 and the upper right speaker 122.

Figure 7:
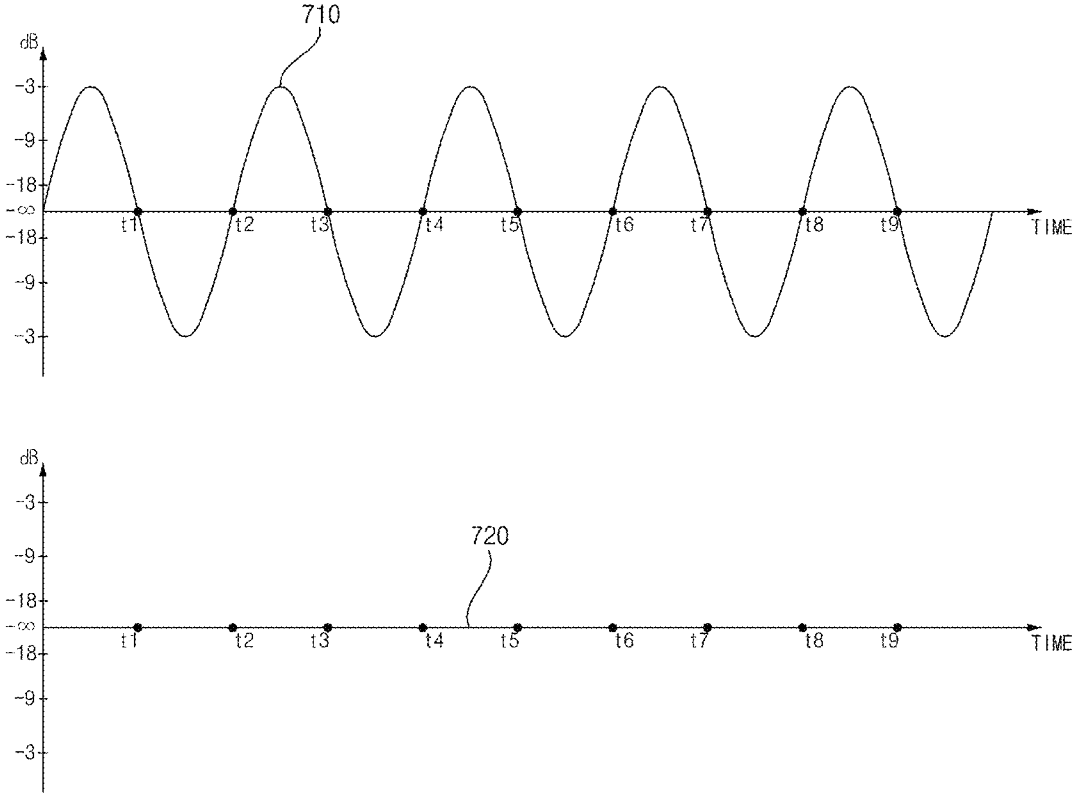
Figure 8:
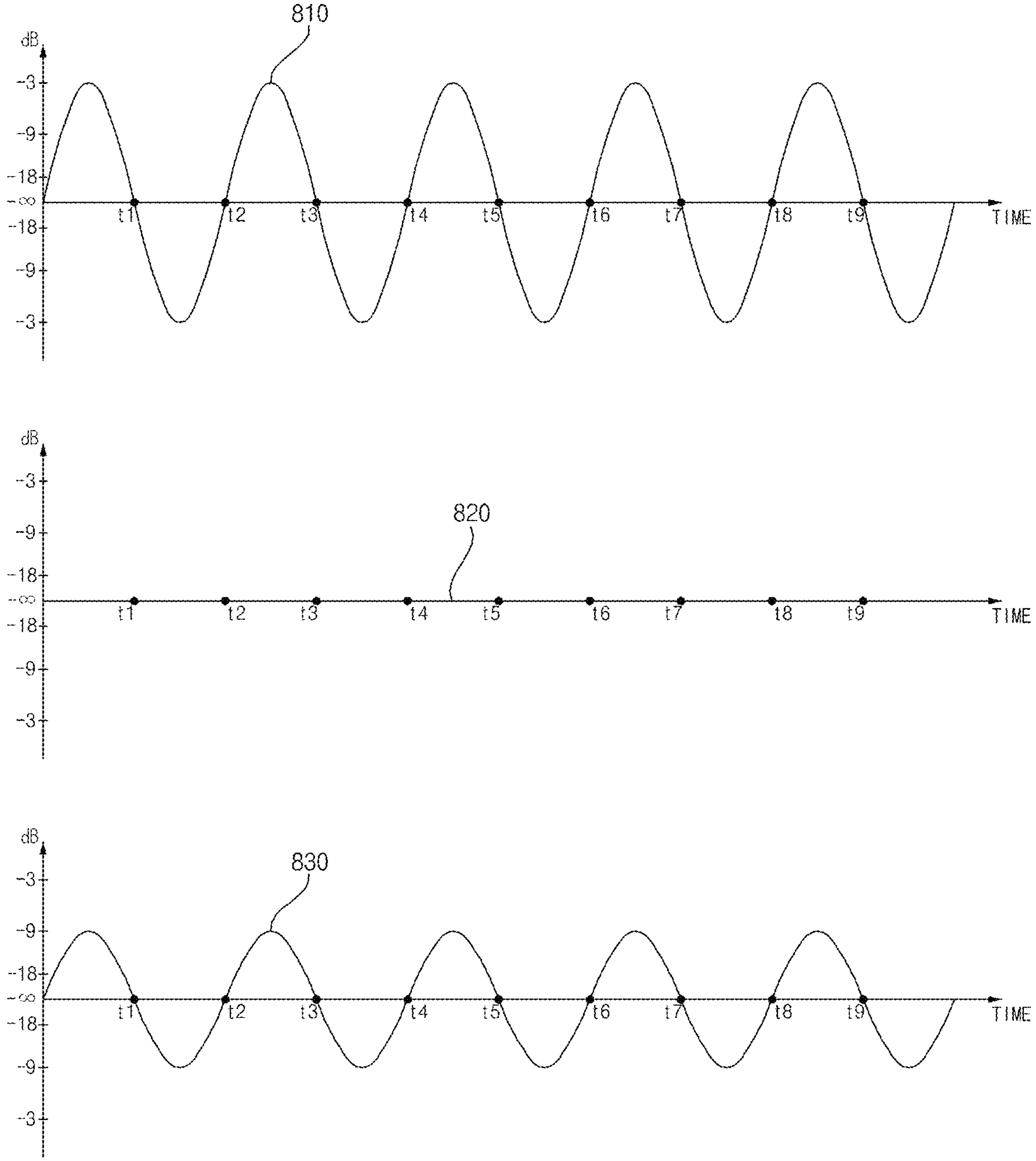

Referring to FIGS. 7 and 8, a waveform 810 of the first output signal TLout, output from the signal processing unit 400, may be the same as a waveform 710 of the first channel signal TLin. A waveform 820 of the second output signal TRout, output from the signal processing unit 400, may be the same as a waveform 720 of the second channel signal TRin.

The audio device 100 may output audio through the upper left speaker 121 based on the first output signal TLout. In this case, audio may not be output through the upper right speaker 122 according to the second output signal TRout.

The waveform 830 of the third channel signal TCout may correspond to the waveform 810 of the first output signal TLout. In this case, an amplitude of the waveform 830 of the third channel signal TCout may be smaller than an amplitude of the waveform 810 of the first output signal TLout.

The audio device 100 may output audio, corresponding to the audio output through the upper left speaker 121, through the upper center speaker 123 based on the third channel signal TCout. In this case, a magnitude of the audio output through the upper center speaker 123 may be smaller than a magnitude of the audio output through the upper left speaker 121.

Figure 9:
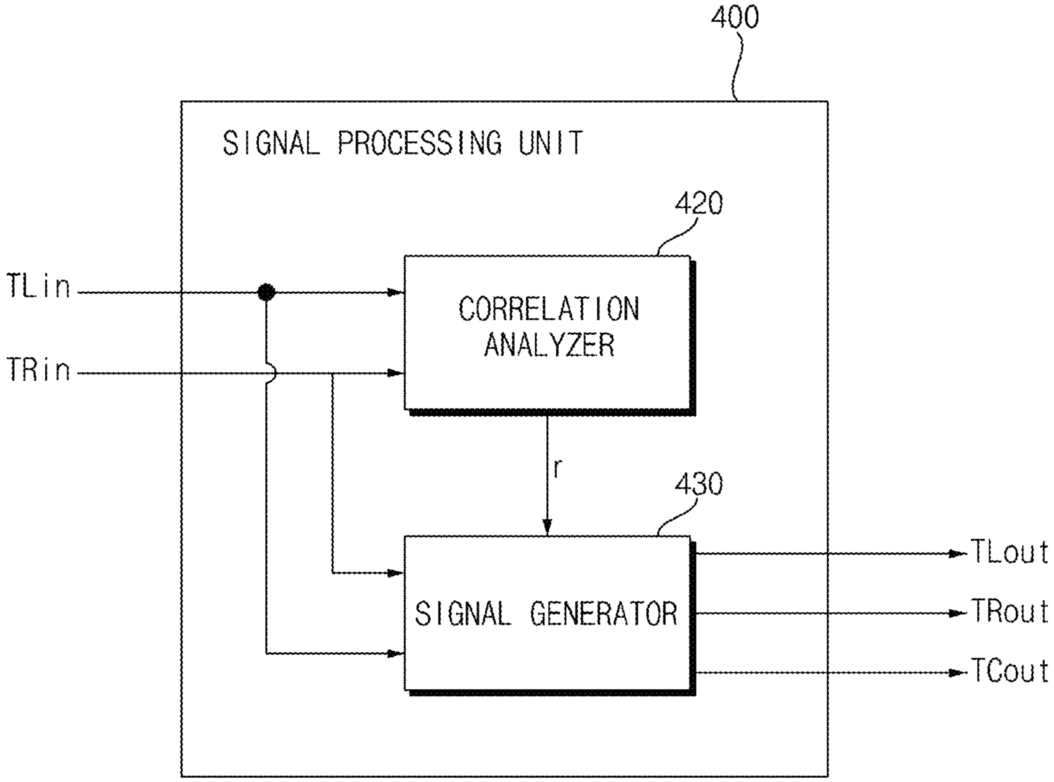

Referring to FIG. 9, the signal processing unit 400 according to an embodiment of the present disclosure may include a correlation analyzer 420 and/or a signal generator 430.

The correlation analyzer 420 may calculate a correlation coefficient between the first channel signal TLin and the second channel signal TRin. Here, the correlation coefficient may be a coefficient indicating a degree of correlation between the waveform of the first channel signal TLin and the waveform of the second channel signal TRin in the time domain. In this case, a degree of similarity between the waveform of the first channel signal TLin and the waveform of the second channel signal TRin may increase as the correlation coefficient is closer to one (1), and the degree of similarity may decrease as the correlation coefficient is closer to zero (0).

For example, the correlation analyzer 420 may calculate the correlation coefficient based on a calculation equation shown in the following Equation 1.

$$r = \frac{\sum (x_i - x_m)(y_i - y_m)}{\sqrt{\sum (x_i - x_m)^2 \times \sum (y_i - y_m)^2}}, \quad \text{[Equation 1]}$$

where r denotes the correlation coefficient, xm denotes a mean value of the first channel signal TLin, and ym denotes a mean value of the second channel signal TRin.

The correlation analyzer 420 may calculate the correlation coefficient based on a sampling rate. For example, the correlation analyzer 420 may obtain values of the first channel signal TLin and the second channel signal TRin based on a sampling rate of 48 kHz. In this case, the correlation analyzer 420 may obtain the values of the first channel signal TLin and the second channel signal TRin based on a value lower than the sampling rate of 48 kHz, e.g., one of divisors of the sampling rate, by considering an amount of computation.

The correlation analyzer 420 may calculate the correlation coefficient according to a predetermined cycle. For example, the correlation analyzer 420 may calculate and output the correlation coefficient at each predetermined interval corresponding to the predetermined cycle.

The signal generator 430 may generate the first output signal TLout, the second output signal Trout, and/or the third channel signal TCout based on the first channel signal TLin, the second channel signal TRin, and the correlation coefficient r. The signal generator 430 may generate the third channel signal TCout based on the correlation coefficient at each predetermined interval according to the predetermined cycle.

For example, the signal generator 430 may generate the first output signal TLout and the second output signal Trout based on a result of multiplying a difference between one (1) and a magnitude of the correlation coefficient r by each of the value of the first channel signal TLin and the value of the second channel signal TRin. That is, as the correlation coefficient is closer to one (1), the amplitude of the waveform of the first output signal TLout and the waveform of the second output signal Trout may be smaller than the amplitude of the waveform of the first channel signal TLin and the waveform of the second channel signal TRin. Meanwhile, as the correlation coefficient is closer to zero (0), the waveform of the first output signal TLout and the waveform of the second output signal Trout may be similar to the waveform of the first channel signal TLin and the waveform of the second channel signal TRin.

For example, the signal generator 430 may generate the third channel signal TCout based on a result of multiplying a signal, obtained by adding up the first channel signal TLin and the second channel signal TRin, by the correlation coefficient r. That is, as the correlation coefficient is closer to one (1), the waveform of the third channel signal TCout may correspond to the waveform of the first channel signal TLin and the waveform of the second channel signal TRin. For example, the signal generator 430 may adjust the amplitude of the signal obtained by adding up the first channel signal TLin and the second channel signal TRin, and then may multiply the magnitude of the correlation coefficient r.

Figure 10:
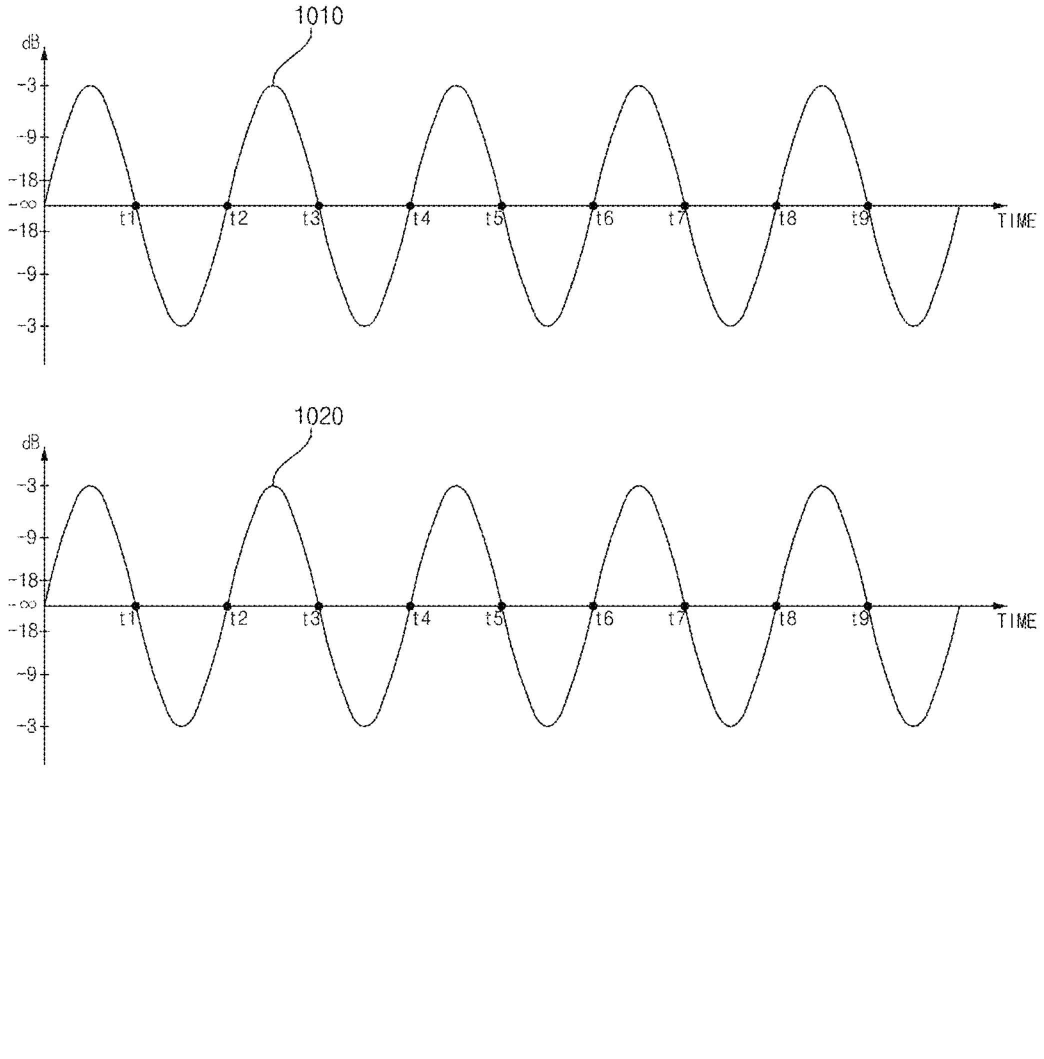
Figure 11:
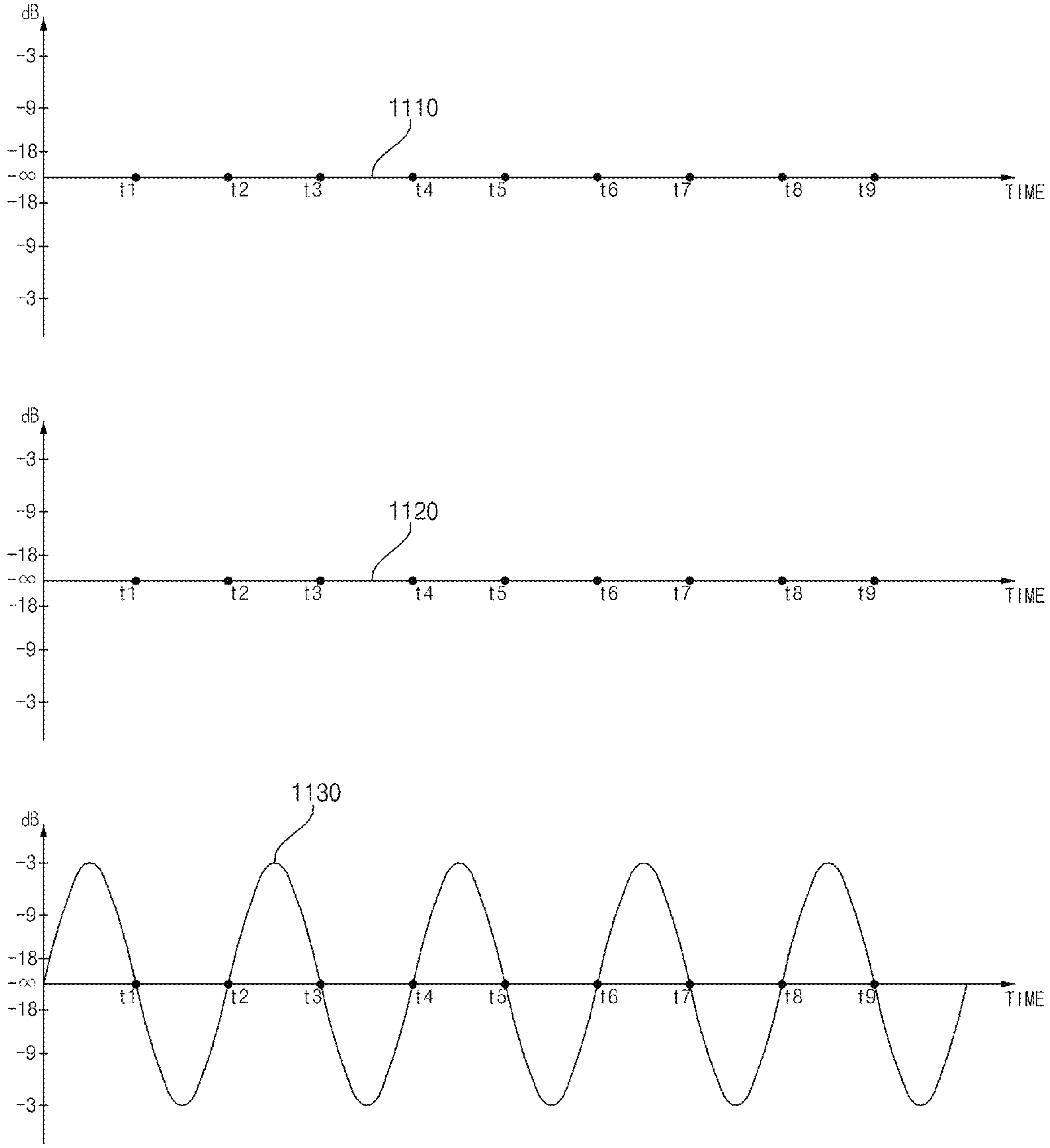

Referring to FIGS. 10 and 11, a waveform 1010 of the first channel signal TLin may be the same as a waveform 1020 of the second channel signal TRin in the time domain. A correlation coefficient between the waveform 1010 of the first channel signal TLin and the waveform 1020 of the second channel signal TRin may be calculated to one (1). For example, the correlation analyzer 420 may calculate the correlation coefficient to one (1) for each interval corresponding to the predetermined cycle.

In this case, as the correlation coefficient is calculated to one (1), the amplitude of a waveform 1110 of the first output signal TLout output from the signal processing unit 400 and a waveform 1120 of the second output signal Trout may correspond to zero (0). In addition, audio may not be output through the upper left and right speakers 121 and 122 according to the first output signal TLout and the second output signal Trout.

Meanwhile, as the correlation coefficient is calculated to one (1), a waveform 1130 of the third channel signal TCout may correspond to the waveform 1010 of the first channel signal TLin and the waveform 1020 of the second channel signal TRin. In this case, the amplitude of the waveform 1130 of the third channel signal TCout may be the same as the amplitude of the waveform 1010 of the first channel signal TLin and the waveform 1020 of the second channel signal TRin.

The audio device 100 may output audio through the upper center speaker 123 based on the third channel signal TCout.

Figure 12:
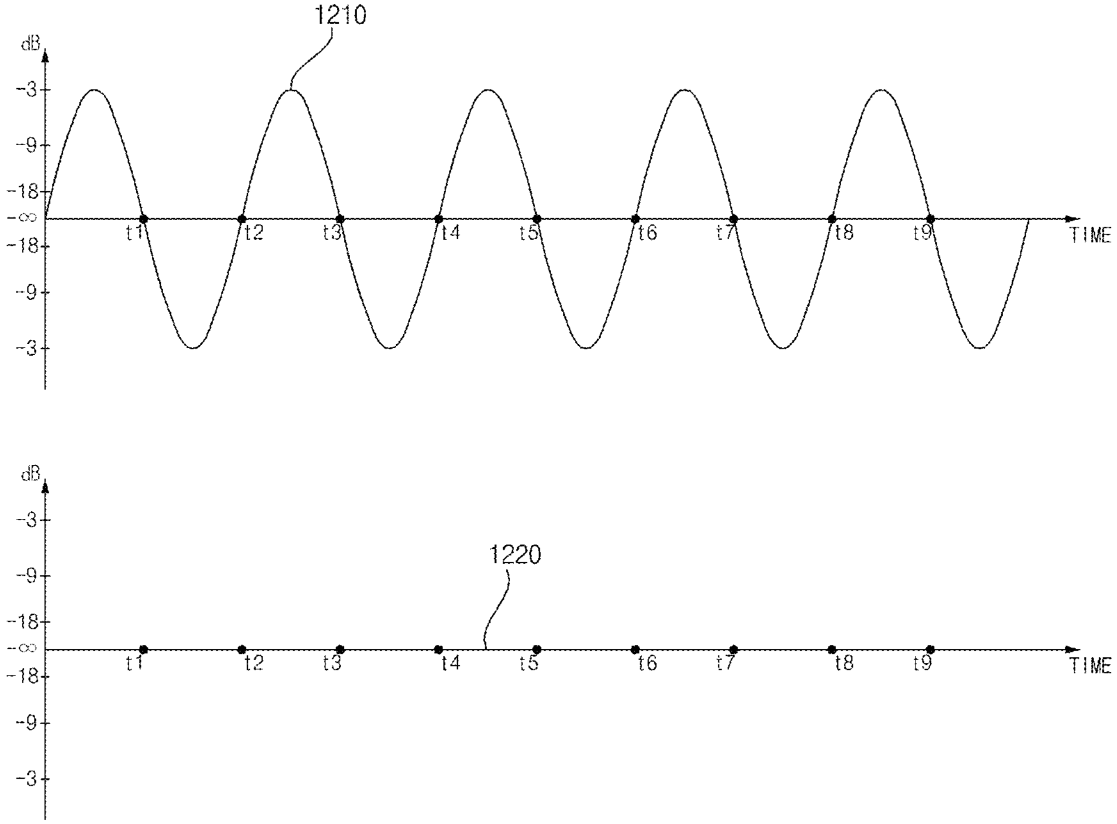
Figure 13:
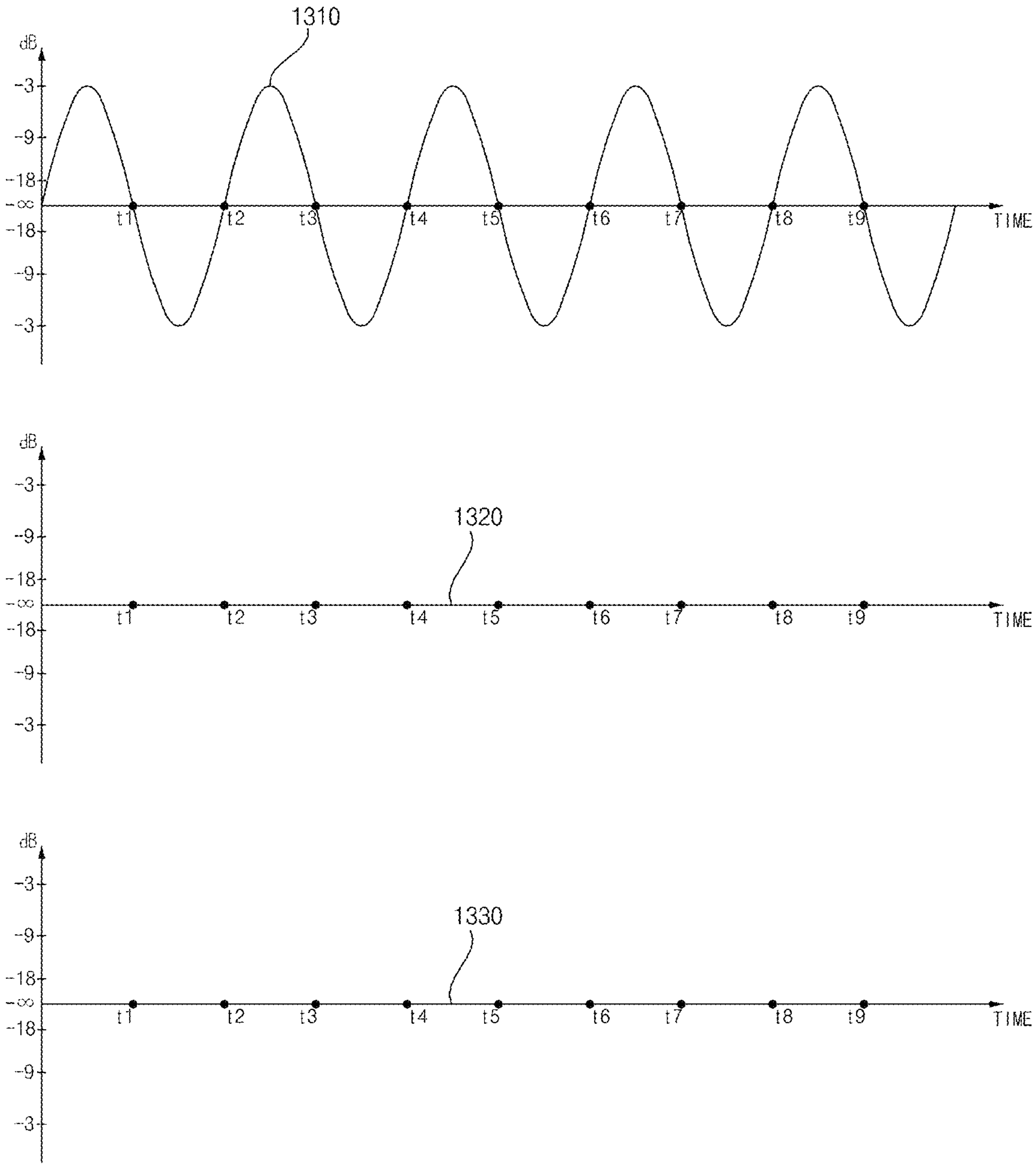

Referring to FIGS. 12 and 13, a correlation coefficient between a waveform 1210 of the first channel signal TLin and a waveform 1220 of the second channel signal TRin may be calculated to zero (0). For example, the correlation analyzer 420 may calculate the correlation coefficient to zero (0) for each interval corresponding to the predetermined cycle.

In this case, as the correlation coefficient is calculated to zero (0), a waveform 1310 of the first output signal TLout, output from the signal processing unit 400, and a waveform 1320 of the second output signal Trout may be the same as the waveform 1210 of the first channel signal TLin and the waveform 1220 of the second channel signal TRin, respectively.

The audio device 100 may output audio through the upper left speaker 121 based on the first output signal TLout.

Meanwhile, as the correlation coefficient is calculated to zero (0), the amplitude of the waveform 1130 of the third channel signal TCout may correspond to zero (0). In addition, audio may not be output through the upper center speaker 123 according to the third channel signal TCout.

Figure 14:
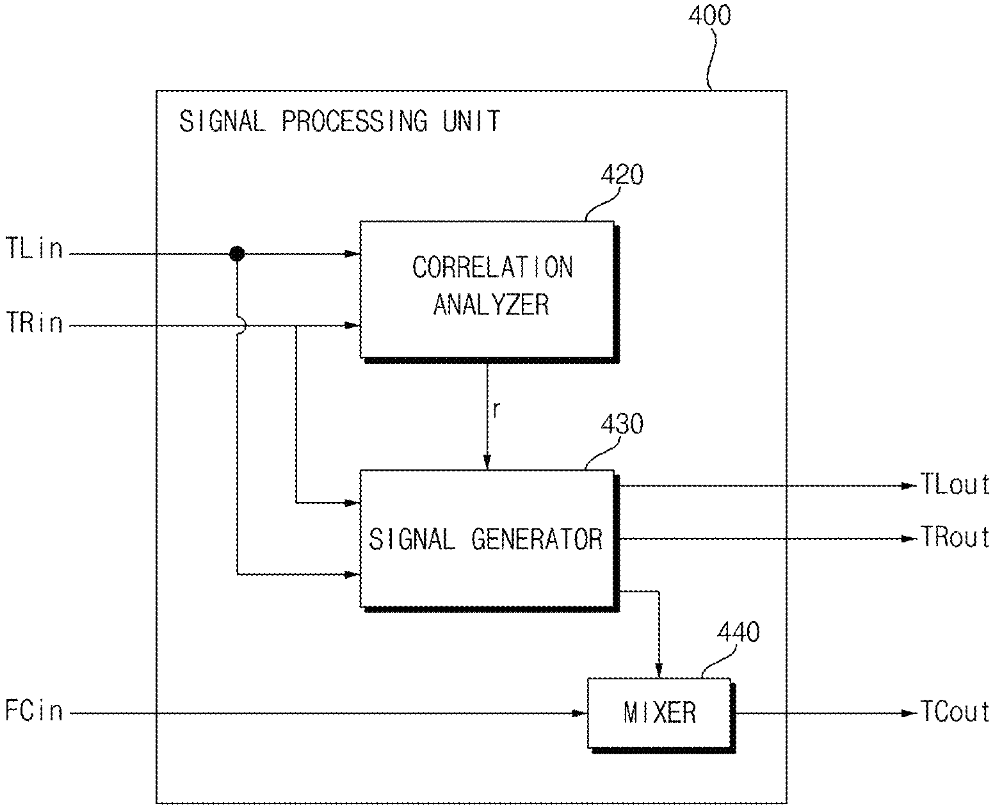

Referring to FIG. 14, the signal processing unit 400 according to an embodiment of the present disclosure may include the correlation analyzer 420, the signal generator 430, and/or a mixer 440. A description of details overlapping those described with reference to FIG. 9 will be omitted.

The signal processing unit 400 may generate the first output signal TLout, the second output signal Trout, and/or a reservation signal based on the first channel signal TLin, the second channel signal TRin, and the correlation coefficient r. For example, the signal generator 430 may generate the reservation signal based on a result of multiplying a signal, obtained by adding up the first channel signal TLin and the second channel signal TRin, by the correlation coefficient r. In this case, as the correlation coefficient is closer to one (1), a waveform of the reservation signal may correspond to the waveform of the first channel signal TLin and the waveform of the second channel signal TRin.

The signal processing unit 400 may receive a signal of a front center channel (hereinafter referred to as a fourth channel signal FCin). In this case, the fourth channel signal FCin may be a time domain signal.

The mixer 440 may mix the reservation signal and the fourth channel signal FCin.

The signal processing unit 400 may output the third channel signal TCout based on the reservation signal and the fourth channel signal FCin. The signal processing unit 400*m* may output a signal, mixed by the mixer 44, as the third channel signal TCout.

In this case, if audio corresponding to the third channel signal TCout is output through the upper center speaker 123 while audio is output corresponding to the fourth channel signal FCin is output through the front center speaker 113, a user located in front of the audio device 100 may perceive an output position of audio, corresponding to the fourth channel signal FCin, as being moved upward. For this reason, even when the audio device 100 is disposed below the image display device 200, a user may perceive the audio as being output at a position corresponding to the image display device 200.

Figure 15:
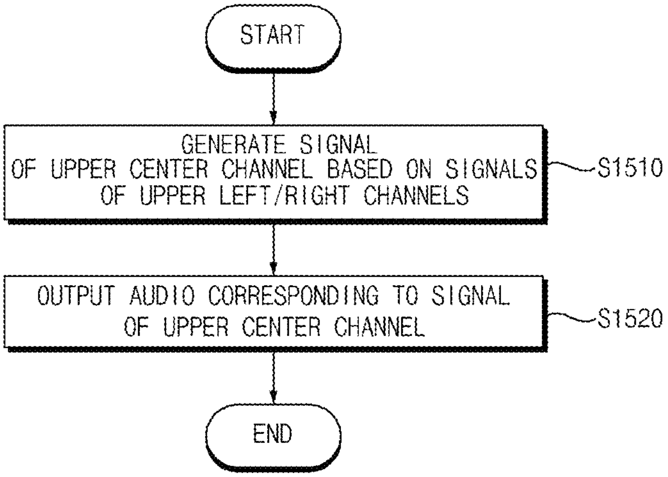
FIG. 15 is a flowchart illustrating a method of operating an audio device according to an embodiment of the present disclosure.

FIG. 15 is a flowchart illustrating a method of operating an audio device according to an embodiment of the present disclosure.

Referring to FIG. 15, the audio device 100 may generate, in operation S1510, a third channel signal, which is a signal of an upper center channel, based on a first channel signal and a second channel signal which are signals of upper left/right channels. For example, the audio device 100 may generate a signal, obtained by adding up the first channel signal and the second channel signal, as the third channel signal. For example, the audio device 100 may generate the third channel signal based on the first channel signal, the second channel signal, and a correlation coefficient between the first channel signal and the second channel signal.

The audio device 100 may output audio corresponding to the third channel signal through the center speaker 123, among the upper speakers 121 to 123, in operation S1520.

In one embodiment, the audio device 100 may output audio corresponding to the first channel signal and the second channel signal through the left and right speakers 121 and 122, respectively, among the upper speakers 121 to 123.

In one embodiment, the audio device 100 may generate a first output signal and a second output signal corresponding to the first channel signal and the second channel signal, respectively, based on the correlation coefficient between the first channel signal and the second channel signal. In this case, the audio device 100 may output audio corresponding to the first output signal and the second output signal through the left and right speakers 121 and 122, respectively, among the upper speakers 121 to 123.

As described above, according to various embodiments of the present disclosure, the quality of sound transmitted to a user may be improved by using the plurality of upper speakers 121 to 123 disposed on the left and right sides and at the center to output audio in an upward direction.

In addition, according to at least one embodiment of the present disclosure, the quality of sound transmitted to a user located at the front may be improved.

The accompanying drawings are used to assist in easy understanding of various technical features and it should be understood that the embodiments presented herein are not limited by the accompanying drawings. As such, the present disclosure should be construed to extend to any alterations, equivalents and substitutes falling within the spirit and scope of the present disclosure.

Meanwhile, an operating method of an audio device according to the present disclosure can be realized as a processor-readable code written on a recording medium readable by a processor included in the audio device. The processor-readable recording medium may be any type of recording device in which data is stored in a processor-readable manner. Examples of the processor-readable recording medium include a ROM, a RAM, a CD-ROM, a magnetic tape, a floppy disc, an optical data storage, and a carrier wave, e.g., data transmission through the Internet. The processor-readable recording medium can be distributed over a plurality of computer systems connected to a network so that a processor-readable code is written thereto and executed therefrom in a decentralized manner.

While the present disclosure has been shown and described with reference to the preferred embodiments thereof, it should be understood that the present disclosure is not limited to the aforementioned specific embodiments, and various modifications and variations may be made by those skilled in the art without departing from the scope and spirit of the invention as defined by the appended claims, and the modified implementations should not be construed independently of the technical idea or prospect of the present disclosure.

What is claimed is:

1. An audio device comprising:

a first speaker disposed on a left side of the audio device and configured to output audio corresponding to a first channel signal in an upward direction;

a second speaker disposed on a right side of the audio device and configured to output audio corresponding to a second channel signal in the upward direction;

a third speaker disposed between the first speaker and the second speaker and configured to output audio corresponding to a third channel signal in the upward direction; and a controller configured to obtain the first channel signal and the second channel signal, and generate the third channel signal based on the first channel signal and the second channel signal, wherein the controller is configured to calculate a correlation coefficient between a waveform of the first channel signal and a waveform of the second channel signal in a time domain based on a predetermined sampling rate, and generate a waveform, corresponding to the waveform of the first channel signal and the waveform of the second channel signal, as the third channel signal based on the calculated correlation coefficient.

2. The audio device of claim 1, wherein a separation distance between the first speaker and the third speaker is equal to a separation distance between the second speaker and the third speaker.

3. The audio device of claim 1, wherein the controller generates the third channel signal based on a result of adding up the first channel signal and the second channel signal.

4. The audio device of claim 1, wherein the controller is configured to:

generate a first output signal corresponding to the first channel signal and a second output signal corresponding to the second channel signal based on the calculated correlation coefficient;

output audio corresponding to the first output signal through the first speaker; and output audio corresponding to the second output signal through the second speaker.

5. The audio device of claim 1, further comprising a fourth speaker disposed to output audio in a forward direction in response to the third speaker, wherein the controller is configured to:

generate a reservation signal based on the first channel signal and the second channel signal; and generate the third channel signal based on a result of mixing the reservation signal and a fourth channel signal.

6. A method of operating an audio device comprising a first speaker, a second speaker, and a third speaker, the method comprising:

obtaining a first channel signal and a second channel signal;

generating a third channel signal based on the first channel signal and the second channel signal;

outputting audio corresponding to the first channel signal through the first speaker in an upward direction;

outputting audio corresponding to the second channel signal through the second speaker in the upward direction; and outputting audio corresponding to the third channel signal through the third speaker in the upward direction, wherein the generating of the third channel signal comprises:

calculating a correlation coefficient between a waveform of the first channel signal and a waveform of the second channel signal in a time domain based on a predetermined sampling rate; and generating a waveform, corresponding to the waveform of the first channel signal and the waveform of the second channel signal, as the third channel signal based on the calculated correlation coefficient.

7. The method of claim 6, wherein a separation distance between the first speaker and the third speaker is equal to a separation distance between the second speaker and the third speaker.

8. The method of claim 6, wherein the generating of the third channel signal comprises generating the third channel signal based on a result of adding up the first channel signal and the second channel signal.

9. The method of claim 6, further comprising:

generating a first output signal corresponding to the first channel signal and a second output signal corresponding to the second channel signal based on the calculated correlation coefficient;

outputting audio corresponding to the first output signal through the first speaker; and outputting audio corresponding to the second output signal through the second speaker.

10. The method of claim 6, wherein the generating of the third channel signal comprises:

generating a reservation signal based on the first channel signal and the second channel signal; and generating the third channel signal based on a result of mixing the reservation signal and a fourth channel signal.

* * * * *